United States Patent [19]
Armstrong et al.

[11] 3,919,838
[45] Nov. 18, 1975

[54] COMBUSTION CONTROL

[75] Inventors: Donald J. Armstrong, Troy; Alan L. Hitzelberger, Grand Blanc, both of Mich.

[73] Assignee: General Motors Corporation, Detroit, Mich.

[22] Filed: Nov. 4, 1974

[21] Appl. No.: 520,452

[52] U.S. Cl............ 60/39.27; 60/39.16 R; 60/39.23; 60/39.28 R; 60/39.28 T; 60/39.29
[51] Int. Cl.² .... F02C 7/10; F02C 7/18; F02C 9/10; F02C 9/14
[58] Field of Search............ 60/39.27, 39.23, 39.29, 60/39.28 R, 39.28 T

[56] References Cited
UNITED STATES PATENTS

| | | | |
|---|---|---|---|
| 2,227,666 | 1/1941 | Noack | 60/39.23 X |
| 3,584,459 | 6/1971 | Amann | 60/39.27 X |
| 3,618,319 | 11/1971 | Kydd | 60/39.27 X |

FOREIGN PATENTS OR APPLICATIONS

| | | | |
|---|---|---|---|
| 858,477 | 12/1952 | Germany | 60/39.27 |

*Primary Examiner*—Clarence R. Gordon
*Attorney, Agent, or Firm*—Paul Fitzpatrick

[57] ABSTRACT

A control for a gas turbine engine combustion apparatus having structure for varying the ratio of primary (combustion) air to total air flow through the engine. It is intended for a motor vehicle turbine. The operator of the vehicle controls engine power by a foot pedal which is connected to vary the area for air flow into the primary and secondary ports of the combustion liner and thus vary the ratio of primary to total air flow. The same movement is transmitted to a metering valve to control the fuel supplied to the combustion apparatus so as to maintain a constant ratio of fuel to primary combustion air and thereby maintain a desired combustion zone temperature. The head across the metering valve is controlled by a by-pass valve which balances it against the difference between total and static air pressures measured at the engine inlet. Thus, the metering head is proportional to the square of total mass air flow. Valve means are also provided to adjust the fuel flow in response to temperature of the air entering the combustion apparatus.

7 Claims, 3 Drawing Figures

COMBUSTION CONTROL

Our invention is directed to controls for the combustion apparatus of gas turbines. More specifically, it is directed to a fuel control integrated with an arrangement for varying the ratio of primary or combustion air to secondary or dilution air in the combustion apparatus, and thereby varying the ratio of primary air to total engine air flow. The apparatus according to the invention meters fuel so as to maintain a substantially constant combustion temperature to minimize the output of undesirable combustion products.

As is well known, if a combustion apparatus runs too cool, there may be incomplete combustion, with output of unburned hydrocarbons and carbon monoxide. On the other hand, running it too hot is a major factor causing production of nitrogen oxides.

Our invention serves to provide a simple control effective to meter fuel to the combustion apparatus in accordance with the flow of primary combustion air and thus maintain a substantially constant desired combustion zone temperature. In its preferred embodiment, a control according to our invention measures the total air flow to the engine. This input is combined with an input from the means for varying the ratio of primary air flow to total air flow to provide a fuel flow based upon primary air flow. Preferably, this quantity is further modified as a function of the temperature of air entering the combustion apparatus, another factor in determining the combustion zone temperature.

The principal objects of our invention are to improve the cleanness of combustion in gas turbine engines, to provide a simple, relatively inexpensive fuel control for a gas turbine engine which acts to maintain a substantially constant fuel-air ratio for combustion, and to provide a fuel control which meters fuel for combustion in proportion to the flow of primary or combustion air to the combustion apparatus.

The nature of our invention and its advantages will be clear to those skilled in the art from the succeeding detailed description of preferred embodiments of the invention, the accompanying drawings thereof, and the appended claims.

Referring to the drawings.

Figure 1:
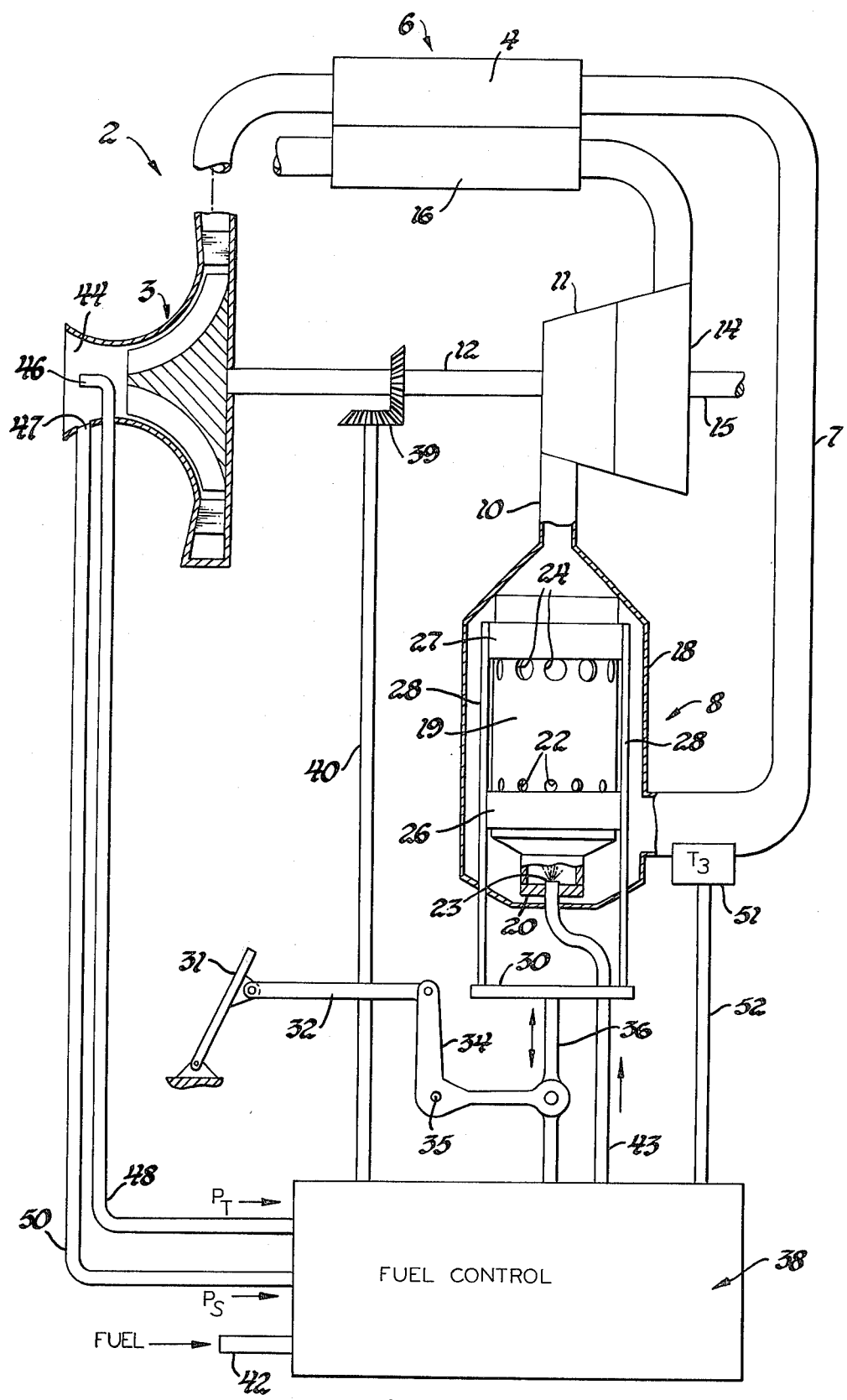
FIG. 1 is a schematic diagram of a gas turbine power plant embodying a control according to our invention.

FIG. 1 illustrates a gas turbine power plant of known type coupled to our fuel control. The engine 2 includes a rotary compressor 3 which delivers compressed air through one pass 4 of a heat exchanger 6 which may be of a regenerative or recuperative type. Air heated in the regenerator flows through a conduit 7 to a combustion apparatus or combustor 8. The resulting combustion products are delivered through ducting 10 to a turbine 11. This turbine is connected through a shaft 12 to drive the compressor 3. The exhaust of turbine 11 is the motive fluid for a power turbine 14 which drives a power output shaft 15. Shaft 15 may be connected through a suitable transmission (not shown) to the driving wheels of a motor vehicle, for example. The exhaust from turbine 14 is discharged through the second pass 16 of the heat exchanger to atmosphere. The turbines 11 and 14 could be a single turbine or could be mechanically coupled together at times if desired.

The combustion apparatus 8 is shown only schematically, since details are immaterial and such apparatuses are known to those skilled in the art. Briefly, the combustor includes an outer casing or housing 18 within which is mounted a flame tube or combustion liner 19. The engine air flow delivered through the conduit 7 enters the space between the housing 18 and liner 19, and thence into the liner. Ordinarily, the primary or combustion air may enter the liner through a swirler 20 at the upstream end of the liner and through a ring of primary air ports 22 near the upstream end of the liner. This air burns fuel, ordinarily liquid hydrocarbon fuel, which is sprayed into the liner through a fuel nozzle 23. We consider it desirable that the combustion zone temperature be about 1320°C. The remainder of the engine air flow is delivered into the liner through a ring of secondary or dilution air ports 24 near the downstream end of the liner. This dilution air mixes with the combustion products to reduce the temperature to a suitable level for introduction into the turbine, ordinarily about 650° to 1040°C., depending upon engine characteristics and power level.

To vary the ratio of primary to secondary air and thereby the ratio of primary air flow to total air flow, any suitable valving means may be provided to control the flow of primary air, of secondary air, or of both. To minimize pressure drops, it is desirable to control both primary and secondary air flow. This may be accomplished in known manner by valve sleeves 26 and 27 slidable on the exterior of the combustion liner and movable to vary inversely the area of ports 22 and 24, respectively. As illustrated, the valve sleeves 26 and 27 are connected together by two or more slidable rods 28 which extend from the combustion apparatus and are fixed to a yoke 30 by which they may be reciprocated. Preferably, in the control system according to our invention, this yoke is moved directly by the power control input to the engine from the operator of the vehicle. The yoke 30 is coupled to the foot throttle or accelerator pedal 31 of the vehicle by any suitable linkage, illustrated as including a link 32 and a bellcrank 34 rotatable about a fulcrum 35. One arm of the bellcrank 34 is coupled to a push-pull rod 36 which is fixed to the yoke 30.

Rod 36 extends also into a fuel control 38 by which the supply of fuel to the nozzle 23 is controlled. The fuel control assembly may conveniently include an engine fuel pump driven from the shaft 12 through suitable gearing indicated at 39 and a pump drive shaft 40. Fuel is supplied to the control from a suitable source such as the vehicle fuel tank or a low pressure boost pump through a fuel supply line 42, and the appropriate quantity of fuel is metered and delivered to the nozzle 23 through a metered fuel line 43.

The inputs to the fuel control to sense engine operating conditions are one of air flow through the engine and one of temperature of the air entering the combustion apparatus $T_3$. Air flow through the engine could be measured at various places, but is most conveniently measured in the inlet 44 to the compressor. Conventional means for measuring flow, which is preferred, is a Pitot-static tube arrangement comprising a total or impact pressure probe 46 transmitting total pressure of the air entering the inlet and a static pressure probe 47 at the same station in the engine inlet. Total pressure, identified as $P_T$, is conducted to the control 38 through a line 48 and static pressure, indicated as $P_S$, is conducted to the control through a line 50. The sense of temperature of air entering the combustion apparatus, identified as $T_3$, is provided by a suitable sensor 51 exposed to air flowing through duct 7. It is connected through suitable means 52, which may be a rotatable shaft, to the control 38.

Figure 2:
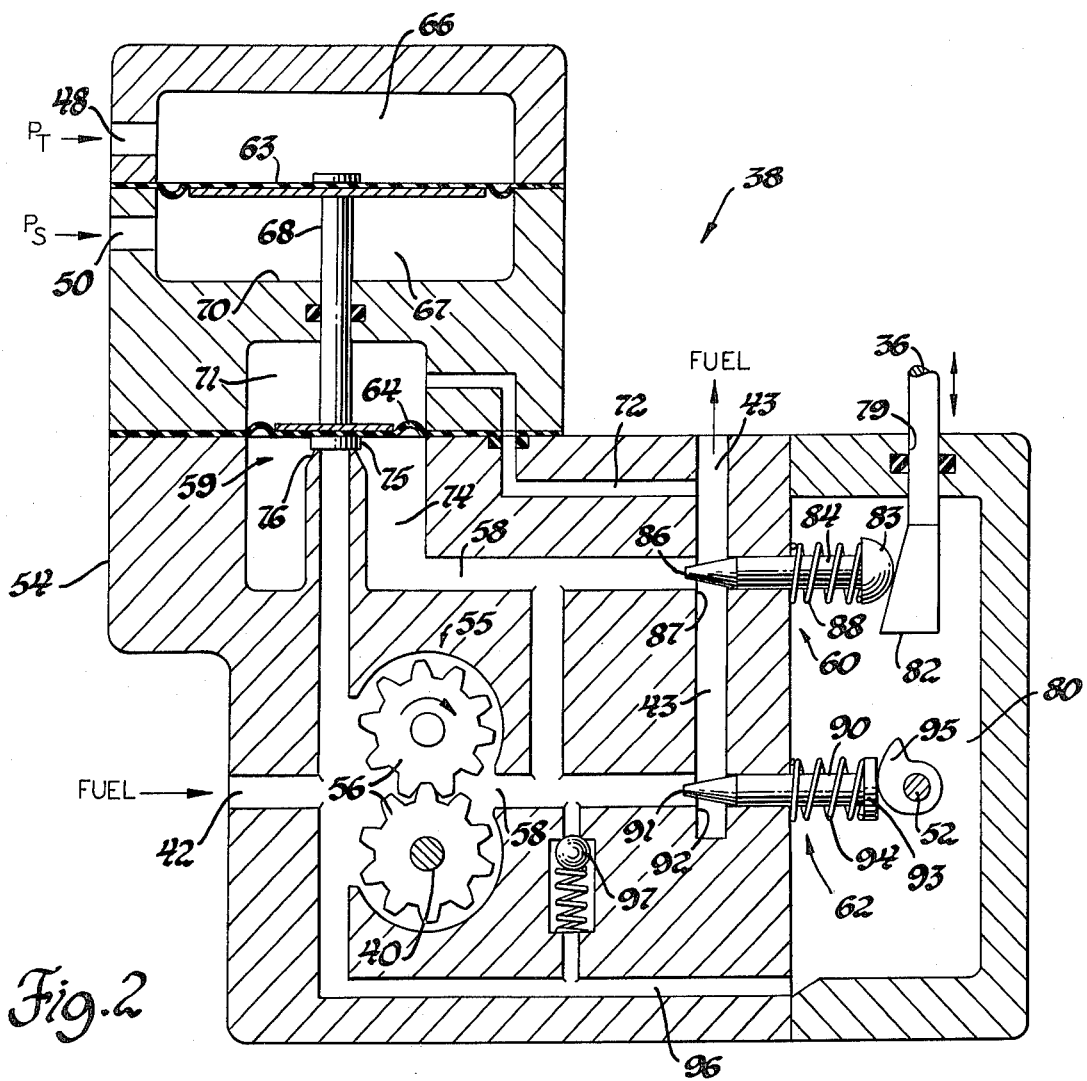
FIG. 2 is a schematic diagram of the fuel control.

With this introduction to the overall nature of the system, we may proceed to the structure of the fuel control 38 as shown in FIG. 2. It includes a body or housing 54 which may be made of as many parts as necessary to provide for assembly of the control, and the parts may be bolted or otherwise fixed together. Details of the housing are immaterial to the invention. The housing 54 defines a chamber for a gear pump 55 including meshing gears 56 one of which is fixed to shaft 40. The fuel inlet 42 delivers fuel to the inlet side of the pump and the pump delivers the fuel under pressure into a multi-branched pump discharge conduit 58, one branch of which extends to a metering head regulating by-pass valve 59. Another branch of conduit 58 extends through a main fuel metering valve 60 to the metered fuel outlet 43 of the control. A third branch of conduit 58 extends through a temperature compensating valve 62 to the outlet 43, valves 60 and 62 being connected in parallel.

The by-pass valve 59 maintains a pressure drop across the valves 60 and 62 proportional to the square of total engine air flow. This valve is controlled by a diaphragm 63 responsive to the difference between total and static pressure from the lines 48 and 50, respectively, and by an opposing diaphragm 64 responsive to pump discharge pressure and to pressure in the metered fuel line 43.

Diaphragm 63 is mounted between sections of the housing 54 so as to define a chamber 66 in which total pressure biases the diaphragm downward as illustrated and a chamber 67 in which static pressure biases the diaphragm upward as illustrated. Diaphragm 63 is coupled by a push rod 68 to diaphragm 64. This rod extends through a low friction seal mounted in a wall 70 and through a chamber 71, and is fixed to diaphragm 64. The metered fuel pressure sense is supplied to chamber 71 from fuel line 43 through a conduit 72. The pump discharge line 58 enters a chamber 74 below diaphragm 64, as illustrated. It will be seen, therefore, that pump discharge pressure biases diaphragm 64 upward and metered fuel pressure biases it downward. Thus, the force exerted on the diaphragm is the product of the area of the diaphragm by the metering head or pressure drop across the valves 60 and 62. Diaphragm 64 is smaller than diaphragm 63. In a specific case it may be approximately one-fourth the area of diaphragm 63, since the metering head is desirably greater than the difference between total and static pressures. The force exerted on rod 68 by diaphragm 63 in response to engine air flow is proportional to the square of mass air flow through the engine, as is inherent in the nature of the total and static pressure probe arrangement.

Rod 68 terminates in a valve poppet 75 which cooperates with an annular valve seat 76 of the by-pass valve 59. A return conduit 78 from the by-pass valve to the fuel pump inlet extends through the seat 76. The force exerted upwardly on rod 68 and valve poppet 75 is equal to the metering head times the effective area of diaphragm 64. The force exerted downwardly is equal to the dynamic or impact pressure (total minus static) of air flowing through the engine times the effective area of diaphragm 63, and thus is proportional to the square of mass air flow. Thus, the poppet 75 is lifted from its seat to whatever extent may be necessary to by-pass sufficient pump discharge to maintain the pressure in line 58 above that in line 43 by an amount directly proportional to the square of mass air flow through the engine.

If this pressure drop were employed to force the fuel through a fixed orifice, which would flow fuel at a rate proportional to the square root of the pressure difference, the resulting fuel flow to the engine would be proportional to total air flow. Such a control would act to maintain a constant turbine inlet temperature rather than a constant combustion zone temperature. According to our invention, the fuel is metered through an orifice the effective area of which is varied proportionally to the ratio of combustion air to total air, and preferably further modified as a function of burner inlet temperature.

Modulation of fuel flow in response to the division of air flow is effected in FIG. 2 by the main fuel metering valve 60 in response to actuation of the valve controlling flow into the combustion liner. Specifically, the rod 36, which is connected to the valving of the combustion liner, extends through a guide 79 in the housing into a chamber 80. Rod 36 is fixed to a reciprocable cam 82 which cooperates with a follower 83 on a stem 84 reciprocably guided in the body 54. Stem 84 terminates in a valve needle 86 which cooperates with an annular seat 87 at the outlet of passage 58 to define a variable area metering orifice controlled by the reciprocation of stem 84. Follower 83 may be held in contact with cam 82 by a compression spring 88. By suitably contouring the cam and the valve needle the effective flow area of the valve 60 is maintained proportional to the ratio of primary air to total air.

Since the combustion zone temperature is affected by the temperature of the air entering the combustion apparatus, which varies with operating conditions of the engine and other factors, it is desirable in most cases to provide some measure of compensation for this factor in our control. This is accomplished by the temperature compensating valve 62. Valve 62, as illustrated schematically, includes a stem 90 guided in the housing 54 terminating in a valve needle 91 which cooperates with an annular seat 92 at one of the outlets of pump discharge passage 58 to control flow between this passage and the discharge passage 43. Stem 90 is integral with a cam follower 93 which is biased by a spring 94 against a cam 95 fixed on the shaft 52 connecting it to the temperature responsive device 51 of FIG. 1. Preferably, the valve and the cam are so contoured that the valve 62 is closed when the air flowing through duct 7 is at or near its maximum level in normal engine operation, which is the level it reaches at full engine power output. As engine fuel flow is decreased, the temperature of the motive fluid entering the turbine and thus of the exhaust gases flowing to the regenerator 16 decrease. Thus the air supplied through conduit 7 to the combustion apparatus is heated to a lesser extent and a greater temperature rise is required to bring it to the desired combustion temperature. Thus, the device 51 may act to open the temperature compensating valve as $T_3$ decrease below the maximum value. The greatest opening would ordinarily occur in starting up a cold engine, in which case the air is not heated by the regenerator. In fact, in starting, the air may initially be cooled by the regenerator.

The temperature sensor may be of any desired type, but the preferred simple mechanism for rotating shaft 52 is a coiled bimetal such as that shown in U.S. Pat. No. 2,976,683 of Flanigan et al, Mar. 28, 1961.

The chamber 80 may be drained to the pump inlet through a passage 96. A conventional relief valve 97 may be provided between the pump outlet and inlet interconnecting passages 58 and 96.

Figure 3:
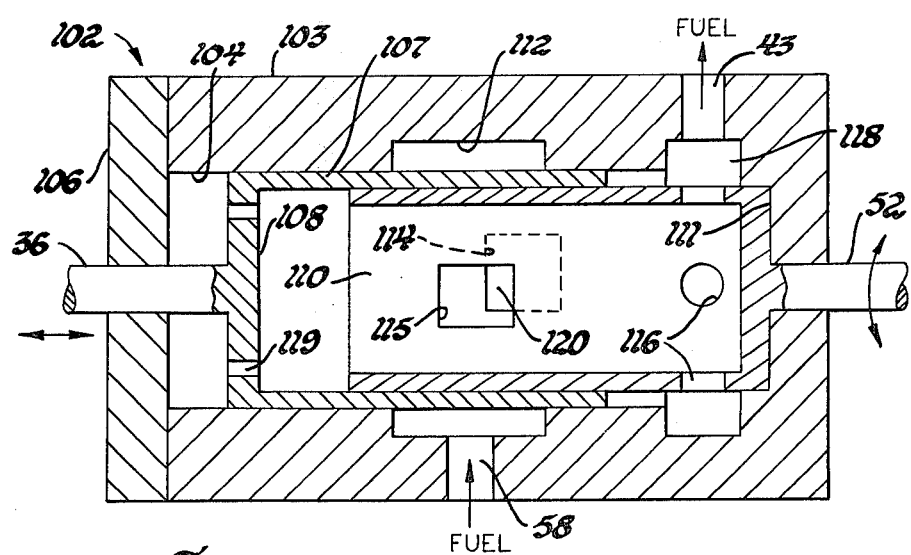
FIG. 3 is a schematic illustration of a further form of fuel metering valve.

More precise control of combustion zone temperature may be accomplished by a modified form of main fuel metering valve which coordinates the inputs of air flow division from push rod 36 and combustion inlet air temperature from shaft 52. Such a valve is illustrated in FIG. 3. The valve 102 of FIG. 3 includes a housing 103 which may form part of the housing 54 illustrated in FIG. 2. As illustrated, housing 103 defines a cylinder 104 closed by a head 106. A cup-shaped outer valve sleeve 107 is reciprocable in the cylinder 104. Valve sleeve 107 is integral with a head 108 fixed to the push rod 36 connected to the combustion chamber valving arrangement. Rod 36 and sleeve 107 are held against rotation but may reciprocate freely in the cylinder 104. An inner valve sleeve 110 fits the interior of sleeve 107. This sleeve is rotatable in sleeve 107 and in a recess 111 at the end of cylinder 104. Sleeve 110 is fixed to the shaft 52 which is rotated as a function of combustion inlet temperature.

Fuel from the pump 55 is delivered through conduit 58 to an extended recess 112 in the wall of cylinder 104 and then flows through variably registering ports 114 in sleeve 107 and 115 in sleeve 110 into the interior of sleeve 110. It then flows outwardly through ports 116 into a recess 118 at the inner end of cylinder 104 which communicates with the metered fuel outlet passage 43. The head 108 of valve sleeve 107 is pierced by ports 119 so that trapped fluid may not block reciprocation of the sleeve.

Although one set of ports 114 and 115 is shown, more than one set may be provided, and it is preferable to have the ports balanced circumferentially of the sleeve to minimize friction.

Let us assume, as will ordinarily be the case, that ports 114 and 115 are rectangular with edges parallel and perpendicular to the valve axis. An orifice 120 for flow is defined by the overlapping portions of the ports. The area of the orifice 120 is proportional to the product of the axial overlap of the ports 114 and 115 and the angular overlap of the ports. The axial overlap is proportional to movement of push rod 36; angular overlap is proportional to rotation of shaft 52. The valve may be set up so that the angular overlap is proportional to the difference between combustion chamber inlet air temperature and the desired combustion zone temperature, and the axial overlap is proportional to the ratio of combustion air to total air. With this arrangement, the metering area is proportional to the product of the air temperature rise desired and the proportion of flow entering the combustion zone. Since the drop through the valve is held proportional to the square of total air flow, the fuel flow is also proportional to total air flow. Thus, the valve 102 as illustrated in FIG. 3 will produce a flow which is proportional to the product of total air flow, the ratio of combustion air flow to total air flow, and the desired temperature rise. The result is a more precise control of combustion temperature. In certain installations this may justify the additional complexity of the combined air flow split and temperature rise compensating valve of FIG. 3.

The simplicity of the control system illustrated will be apparent. It provides for direct control by the vehicle operator of the power level of the engine while maintaining a combustion temperature best suited to minimizing undesired emissions.

In the operation of the control, if we assume the engine to be operating at some relatively low power level and the operator wishes to increase the power output of the engine, he rotates the foot pedal 31 clockwise as illustrated to enlarge the primary air ports or to close the secondary air ports 24, or both, thus feeding more air into the primary combustion zone. The same movement opens the valve 60 or 102 to supply more fuel to the engine. The greater fuel supply raises the temperature of the combustion products flowing through duct 10 and increases turbine power output. As turbine 11 accelerates, the compressor discharges a greater mass of air, which is reflected in a compensating increase in fuel flow by virtue of the increased metering head demanded by the by-pass valve 59. The engine ultimately stabilizes at whatever power level is called for by the control 31. To reduce power, the opposite action is taken, primary air flow is reduced along with fuel flow, reducing turbine power output and ultimately reducing air flow. One beneficial feature of the control is the fact that it guards against flameout on decrease of fuel flow, since the fuel flow decreases only concurrently with decrease in combustion air flow.

It is believed that the advantages of the invention will be clear to those skilled in the art from the preceding detailed description.

The detailed description of preferred embodiments of the invention for the purpose of explaining the principles thereof is not to be considered as limiting or restricting the invention, since many modifications may be made by the exercise of skill in the art.

We claim:

1. A control system for a gas turbine engine having combustion apparatus including means for varying the ratio of primary air flow into the combustion apparatus to total air flow, the system including metering valve means operated in conjunction with the said air flow ratio varying means effective to maintain an effective flow metering area proportional to the said ratio connected to meter fuel to the combustion apparatus; means responsive to the rate of total air flow through the engine; means for pumping fuel; and means effective to control the pressure of pumped fuel so as to maintain the pressure drop across the metering valve means proportional to the square of the said total air flow rate; so as to maintain an approximately constant ratio between fuel flow to the combustion apparatus and primary air flow, thus regulating combustion temperature.

2. A control system for a gas turbine engine having combustion apparatus including means for varying the ratio of primary air flow into the combustion apparatus to total air flow, the system including first metering valve means operated in conjunction with the said air flow ratio varying means effective to maintain an effective flow metering area proportional to the said ratio connected to meter fuel to the combustion apparatus; second metering valve means responsive to the temperature of air flowing into the combustion apparatus effective to increase the metering area with decrease in the said temperature; means responsive to the rate of total air flow through the engine; means for pumping fuel; and means effective to control the pressure of pumped fuel so as to maintain the pressure drop across the metering valve means proportional to the square of the said total air flow rate; so as to maintain a ratio between fuel flow to the combustion apparatus and primary air flow such as to control combustion temperature to an approximately constant value.

3. A control system for a gas turbine engine having combustion apparatus including means for varying the ratio of primary air flow into the combustion apparatus to total air flow, the system including metering valve means operated in conjunction with the said air flow ratio varying means and responsive to the temperature of air flowing into the combustion apparatus effective to maintain an effective flow metering area based upon the said ratio and modified in response to the said temperature connected to meter fuel to the combustion apparatus; means responsive to the rate of total air flow through the engine; means for pumping fuel; and means effective to control the pressure of pumped fuel so as to maintain the pressure drop across the metering valve means proportional to the square of the said total air flow rate; so as to maintain an approximately constant ratio between fuel flow to the combustion apparatus and the product of primary air flow and the temperature rise required to result in a desired constant combustion temperature.

4. A control system for a gas turbine engine having combustion apparatus including means for varying the ratio of primary air flow into the combustion apparatus to total air flow, the system including metering valve means operated in conjunction with the said air flow ratio varying means effective to maintain an effective flow metering area proportional to the product of the said ratio and a quantity proportional to the difference between the temperature of air flowing into the combustion apparatus and a desired substantially constant combustion temperature connected to meter fuel to the combustion apparatus; means responsive to the rate of total air flow through the engine; means for pumping fuel; and means effective to control the pressure of pumped fuel so as to maintain the pressure drop across the metering valve means proportional to the square of the said total air flow rate so as to maintain an approximately constant combustion temperature.

5. A control system for a gas turbine engine having combustion apparatus including means for varying the ratio of primary air flow into the combustion apparatus to total engine air flow, the system including operator-operable power level control means coupled to the said varying means so as to control the said ratio as a direct function of power level control means position; means for supplying fuel under pressure; means for regulating the pressure of the supplied fuel; metering valve means controlling the flow of fuel to the combustion apparatus, the metering valve means including a valve member coupled to the power level control means so as to open proportionately to the said ratio; and operating means for the said pressure regulating means responsive in opposite senses to the pressure drop across the metering valve means and to a force proportional to the square of total engine air flow rate effective to maintain the said pressure drop proportional to the square of total engine air flow, the operating means including movable wall means responsive to the difference between total and static air pressure at a station in the engine.

6. A control system for a gas turbine engine having combustion apparatus including means for varying the ratio of primary air flow into the combustion apparatus to total engine air flow, the system including operator-operable power level control means coupled to the said varying means so as to control the said ratio as a direct function of power level control means position; means for supplying fuel under pressure; means for regulating the pressure of the supplied fuel, metering valve means controlling the flow of fuel to the combustion apparatus, the metering valve means including a valve member coupled to the power level control means so as to open proportionately to the said ratio; operating means for the said pressure regulating means responsive in opposite senses to the pressure drop across the metering valve means and to a force proportional to the square of total engine air flow rate effective to maintain the said pressure drop proportional to the square of total engine air flow, the operating means including movable wall means responsive to the difference between total and static air pressure at a station in the engine; and means for varying the effective area of the metering valve means in response to the difference between a desired fixed combustion zone temperature and the temperature of the air flowing into the combustion apparatus.

7. A control system for a gas turbine engine having combustion apparatus including means for varying the ratio of primary air flow into the combustion apparatus to total engine air flow, the system including operator-operable power level control means coupled to the said varying means so as to control the said ratio as a direct function of power level control means position; means for supplying fuel under pressure; metering valve means controlling the flow of fuel to the combustion apparatus, the metering valve means including a valve member coupled to the power level control means so as to open proportionately to the said ratio; operating means for the said pressure regulating means effective to maintain the said pressure drop proportional to the square of total engine air flow; and means for varying the effective area of the metering valve means in response to the difference between a desired fixed combustion zone temperature and the temperature of the air flowing into the combustion apparatus.

\* \* \* \* \*